March 14, 1967     L. J. EUVINO ETAL     3,309,602

CURRENT CONTROLLERS

Filed July 18, 1963

INVENTORS
LOUIS J. EUVINO
ROBERT L. ZINKE
BY
*ATTORNEY*

United States Patent Office 3,309,602
Patented Mar. 14, 1967

3,309,602
CURRENT CONTROLLERS
Louis J. Euvino, Bronx, and Robert L. Zinke, East Northport, N.Y., assignors to Sperry Rand Corporation, Great Neck, N.Y., a corporation of Delaware
Filed July 18, 1963, Ser. No. 295,928
7 Claims. (Cl. 321—46)

This invention relates to switching circuits and more particularly to alternating current switching circuits having surge prevention means.

It is frequently necessary to switch large values of alternating current at random intervals. If the switching happens to occur when the instantaneous value of the supply voltage is high, intolerably large transients may be generated. These transients can cause destructive arcing at switch or relay contacts. High induced voltages may also be encountered in such situations, so that additional insulation and larger components may be required to accommodate these surges. Furthermore, the surges can cause troublesome radio interference in nearby apparatus.

The problem becomes particularly acute when large currents must be supplied intermittently to components in a system containing delicate electrical instruments. Thermostatically controlled electric heaters, for instance, are frequently used for maintaining measuring instruments at a uniform temperature. These electric heaters draw considerable current. The heating current must be supplied at random intervals and can easily disrupt the operation of the entire system.

In the past, attempts have been made to suppress such transients by filtering out the undesired frequency components. Such filters, however, are bulky and expensive.

It is an object of the present invention to provide an alternating current switching circuit that can switch large amounts of current with a minimum of radio interference.

It is another object of the present invention to provide an alternating current switching circuit that can switch large amounts of current without producing large current surges.

Yet another object of the present invention is to provide an alternating current switching circuit that is comparatively small and lightweight.

These and other objects are achieved by providing an instantaneous voltage sensing means that permits the current to commence only when the supply voltage is near zero.

Figure 1:
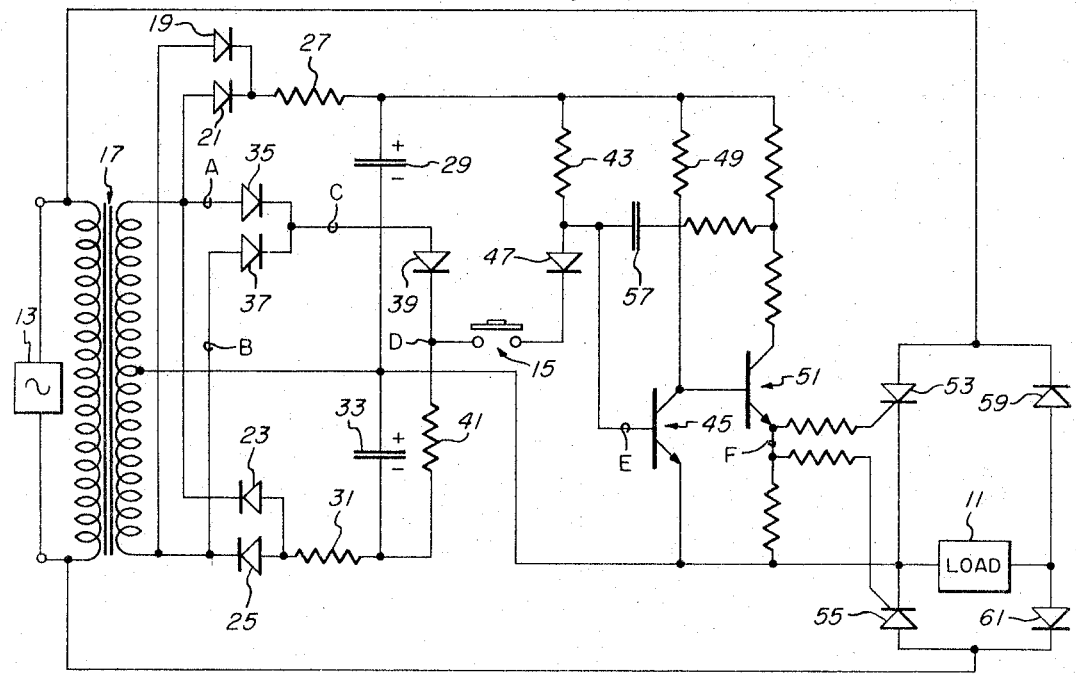
Figure 2:
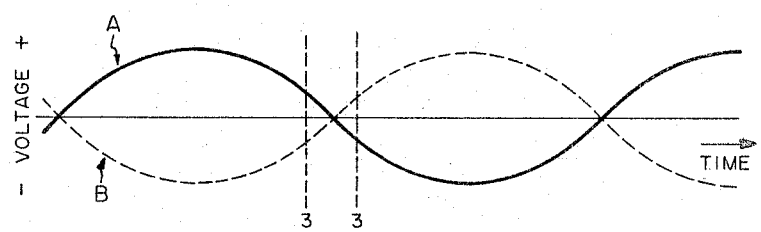
Figure 3:
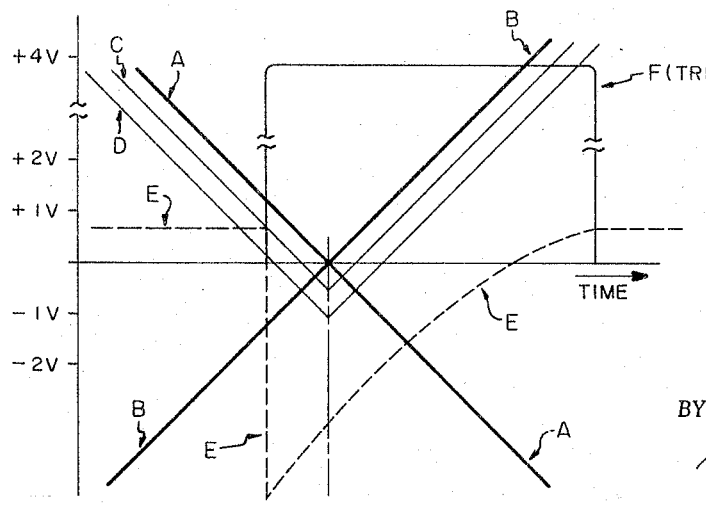

The present invention is explained with reference to the accompanying drawings in which:

FIG. 1 is a circuit diagram of a switching circuit constructed according to the principles of the invention, FIG. 2 is a graph useful in explaining this invention, and FIG. 3 is an expanded detail section taken between the lines 3—3 of the graph of FIG. 2 showing certain significant voltage relationships.

FIG. 1 illustrates a typical circuit employing the invention. In this circuit, a load 11 is energized from a source 13 when the switch 15 is closed.

A transformer 17 is provided with a center-tapped winding. Four diodes 19, 21, 23 and 25 are arranged to provide positive full-wave rectified voltage pulses to a first resistance-capacitance filter network comprised of the resistor 27 and a capacitor 29 and negative full-wave rectified voltage pulses to a second resistance-capacitance filter network comprised of a resistor 31 and a capacitor 33. Another pair of diodes 35 and 37, are inserted in opposite ends of the transformer secondary winding. These diodes provide a full-wave rectified signal to a series diode 39 and a biasing resistor 41. The resistor, in turn, is connected to the negative supply terminal of the capacitor 33.

The capacitor 29 becomes charged so as to maintain the various switching circuit components at a suitable positive voltage with respect to the common bus connected to the center tap of the transformer 17.

The capacitor 33 becomes charged so as to maintain the circuit components connected to its outer plate at a negative potential with respect to the common bus.

A base resistor 43 connects the base of a first transistor 45 to the positive D.C. line. A diode 47 is also connected to the resistor 43 and to the control switch 15. This switch may be of any suitable type. It may, for instance, comprise thermostat contact points. The collector of the transistor 45 is connected to the positive D.C. line through a resistor 49. This collector is further connected to the base of a second transistor 51. A time delay capacitor 57 is connected between the base of the transistor 45 and the collector circuit of the transistor 51. The transistors 45 and 51, together with the time delay capacitor 57 and the associated circuit resistors, constitute a monostable multivibrator that converts a negative-going pulse formed during the time that the switch 15 is closed into a positive-going trigger pulse having a duration determined mainly by the values of the resistor 43 and the capacitor 57. Techniques for maintaining monostable multivibrators in the quasi-stable state for any reasonable time are well known in the art. In a typical current controller constructed according to the principles of the invention, the multivibrator was designed to remain in the quasi-stable state for approximately 300 microseconds.

Leads from the emitter of the transistor 51 (point F) are connected to the gate electrodes of the silicon controlled rectifiers 53 and 55. These silicon controlled rectifiers together with the diodes 59 and 61 form a bridge circuit for coupling current to the load 11.

The diodes 35, 37 and 39 permit the full-wave rectified voltage to be applied to the switch 15 (point D). When the switch is open, this voltage wave falls below the voltage of the center tap by an amount equal to the voltage drop of the diodes 35 and 39 in series or the diodes 37 and 39 in series at the instant that the output voltage from the transformer 17 is zero. During this time, the transistor 45 is conducting and the voltage at point E remains above the level of the center tap by an amount equal to the forward base-to-emitter drop of this transistor. If the switch 15 is closed, the voltage at point E substantially follows the voltage at point C when this latter voltage falls below the normal level of point E. When the voltage at point E reaches the level at which the transistor 45 is switched off, the multivibrator will change states, and the voltage at point E will drop sharply away from that at point C.

FIG. 2 represents the voltages appearing at points A and B in the circuit. FIG. 3 represents an enlarged section of the crossover points of the two voltage waveforms of FIG. 2, together with the corresponding voltages appearing at points C, D, E, and F during that time interval.

The operation of the device can be understood by referring to FIG. 1 and to FIG. 3.

As illustrated in FIG. 3, point C always follows the more positive of points A and B. However, point C is approximately 0.6 volt lower in potential because of the forward biased diode voltage drop of either diode 35 or diode 37. Similarly, point D follows point C but is approximately 0.6 volt lower in potential than point C. With the switch open, point E is maintained at a positive potential of approximately 0.6 volt by the forward biased base-to-emitter junction of the transistor 45.

Power is applied to the load by closing the switch 15. If the voltage of point D happens to be at a large positive value at the instant the switch is closed, the diode 47 is back biased and the transistor 45 is unaffected. As point D approaches zero, a forward bias is applied to the diode 47. When point D reaches zero, the forward bias drop of the diode 47 is overcome and this diode begins to conduct.

As the diode 47 begins to conduct, it diverts base current from the transistor 45 until this transistor is turned off. This drives the transistor 51 into conduction and produces a positive trigger pulse at the emitter which in turn is coupled to the gate terminals of the silicon controlled rectifiers 53 and 55.

It will be noticed that the trigger voltage pulse commences at the instant that the point D crosses the zero voltage axis. Thus, the combination of the diodes 39 and 47 together with the diodes 35 and 37 provide means to anticiapte the termination of each half-cycle of voltage by several microseconds. Since silicon controlled rectifiers require several microseconds to become fully conducting, this feature assures that the rectifier will be capable of conducting as soon as adequate anode voltage is applied in the following half-cycle.

The capacitor 57 becomes negatively charged when the transistor 45 is turned off. This provides a time delay that maintains the trigger voltage on the silicon controlled rectifier gate electrodes for a sufficient time to insure that conduction is established in the appropriate rectifier. This rectifier remains conductive until its anode voltage approaches zero at the end of the half-cycle. Thereafter, if the switch 15 remains closed, another starting pulse will be supplied and the opposite rectifier will conduct for a half-cycle.

Since the silicon controlled rectifiers can be turned on only when the supply voltage is near zero, there can be no large current surges when the load is energized. Since the silicon controlled rectifiers are turned off only when the instantaneous value of the supply voltage is very low, there can be no quick interruption of large currents. Voltage transients which might accompany sudden demands for large currents are practically eliminated.

Although the circuit that has been described represents a presently preferred form of the invention, it will be appreciated that variants of this particular circuit may be constructed in accordance with these principles.

The multivibrator, for instance, functions to increase the duration of the pulse that occurs when the diode 47 becomes conductive. The longer pulse assures that the trigger supplied to the silicon controlled rectifiers will turn on these devices in response to closure of the control switch.

Various kinds of pulse stretchers are well known in the art. Most of these can be readily substituted for the particular multivibrator that has been described.

Similarly, vacuum or gas tubes can be used in place of the equivalent solid state devices if desired.

If desired, the diode 39 could be eliminated. In this case, the trigger voltage would commence when the point C crossed the zero voltage axis so that a smaller anticipation time would be realized.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In combination,
   (a) an alternating current supply,
   (b) a silicon controlled rectifier to conduct rectified current from the supply to a load,
   (c) means to sense the instantaneous value of the output of the supply,
   (d) a monostable multivibrator,
   (e) means to trigger the multivibrator into the quasi-stable state when the instantaneous value of the output of the supply approaches zero, and
   (f) means to supply a triggering voltage to the silicon controlled rectifier when the multivibrator is in the quasi-stable state.

2. Means to switch rectified currents to a load comprising:
   (a) an alternating current supply,
   (b) a pair of silicon controlled rectifiers to permit current to flow to the load from alternate sides of the supply,
   (c) a monostable multivibrator,
   (d) an input transistor in said multivibrator,
   (e) a switch to momentarily divert current from the input transistor as the instantaneous output voltage from the supply approaches zero,
   (f) delay means in the multivibrator to hold the input transistor in a non-conducting condition for a predetermined length of time after current to the input transistor has been momentarily diverted,
   (g) output means on said multivibrator to produce a triggering voltage whenever the input transistor is non-conducting, and
   (h) conducting means to couple said triggering voltages to the gate electrodes of both silicon controlled rectifiers.

3. In combination:
   (a) a source of alternating current,
   (b) a rectifier connected to receive energy from said source,
   (c) a switch having input and output terminals, said switch having its input terminal connected to receive a signal from said rectifier,
   (d) means to separate the instantaneous voltage at the input terminal of said switch from the instantaneous voltage at the output terminal of the rectifier by a predetermined differential,
   (e) a monostable multivibrator, said multivibrator being arranged to produce an output voltage whenever the multivibrator is in the quasi-stable state,
   (f) an input switching element in said multivibrator,
   (g) rectifying means having a forward biased voltage drop numerically equal to said predetermined voltage differential, said rectifying means interconnecting the output terminal of said switch and the input circuit of said switching element so as to pass a switching current when exposed to a suitable voltage differential,
   (h) a silicon controlled rectifier connected to transmit energy from the source to a load, and
   (i) conducting means to transmit an output voltage from the multivibrator to the gate electrode of the silicon controlled rectifier.

4. In combination:
   (a) a source of alternating current,
   (b) a full-wave rectifier connected to receive energy from said source,
   (c) a normally-open switch having input and output terminals, said switch being coupled to the output circuit of said full-wave rectifier,
   (d) means to maintain the voltage at the input terminal of said switch below the instantaneous voltage of the full-wave rectifier output by a predetermined voltage differential,
   (e) a monostable multivibrator,
   (f) a normally-conducting input transistor in said multivibrator,
   (g) said multivibrator being arranged to produce an output voltage whenever said input transistor is switched to a non-conducting state,
   (h) rectifying means having a forward biased voltage drop numerically equal to said predetermined voltage differential, said rectifying means being connected to pass current from the input circuit of said transistor to the output terminal of said switch,
(i) a pair of silicon controlled rectifiers connected to pass current from said source to a load, and
(j) connecting means to pass output pulses from said multivibrator to the gate electrodes of said silicon controlled rectifiers.

5. In combination:
(a) a source of alternating current,
(b) a transformer coupled to receive energy from said source,
(c) a center-tapped secondary winding on said transformer,
(d) a capacitor connected to the center tap of said secondary winding,
(e) a rectifier connected to charge said capacitor to a negative potential from the secondary winding,
(f) first and second diodes having their anodes connected to the first and second ends of said secondary winding respectively, said diodes further having their cathodes connected together,
(g) a third diode having its anode connected to the cathodes of said first and second diodes,
(h) a resistor interconnecting the cathode of the third diode and the negative terminal of the capacitor,
(i) a normally-open switch having its input terminal connected to the junction of said resistor and the third diode,
(j) a monostable multivibrator,
(k) a normally-conducting NPN input transistor in said multivibrator having its emitter connected to the center tap of said secondary winding,
(l) a fourth diode having its anode connected to the base of said input transistor and its cathode connected to the output terminal of the switch,
(m) a silicon controlled rectifier bridge connected to pass current from the source to a load when the silicon controlled rectifiers in the bridge are conducting, and
(n) conducting means interconnecting the output of the multivibrator and the gate electrodes of the silicon controlled rectifiers.

6. In combination:
(a) a source of alternating current,
(b) a bridge rectifier circuit connected to convey energy from the source to a load,
(c) a pair of silicon controlled rectifiers forming adjacent arms of said bridge,
(d) a center-tapped transformer connected to receive energy from said source,
(e) a rectifier coupled to convert energy from the transformer into a full-wave rectified voltage signal,
(f) a normally-open switch having an input terminal connected to the output of the rectifier,
(g) biasing means to set the D.C. level of the output of the rectifier, said biasing means being adjusted so that the input terminal of said switch becomes negative with respect to the transformer center tap when the output of the transformer approaches zero,
(h) a monostable multivibrator,
(i) a normally-conducting input transistor in said multivibrator,
(j) an output terminal on said switch,
(k) a diode having its anode connected to the input transistor and its cathode connected to said output terminal, said diode serving to divert current so as to cut off conduction in the input transistor when the switch output terminal is driven to a negative potential,
(l) output means on said multivibrator connected to provide a positive voltage whenever the input transistor is in a non-conducting state, and
(m) conducting means interconnecting said output means and the gate electrodes of both silicon controlled rectifiers.

7. In combination:
(a) a source of alternating current,
(b) a center-tapped transformer connected to receive energy from said source,
(c) a full-wave rectifier connected across the output of said transformer,
(d) a first diode connected to pass current from the positive terminal of said rectifier,
(e) a biasing resistor connected to return current from the first diode to said rectifier,
(f) a normally-open control switch having an input terminal and an output terminal, said input terminal being connected to the junction of said first diode and said biasing resistor,
(g) a capacitor connected between the center tap of the transformer and the negative end of the biasing resistor,
(h) a monostable multivibrator,
(i) a normally-conducting input transistor in said multivibrator,
(j) a second diode connected to divert current from the input circuit of said transistor to the output terminal of said switch whenever this terminal is at a negative potential,
(k) output means on said multivibrator to produce a positive trigger voltage when current is diverted from said transistor,
(l) a rectifier bridge for coupling energy from said source to a load,
(m) first and second silicon controlled rectifiers in adjacent arms of said bridge, and
(n) conducting means interconnecting the multivibrator output means and the gate electrodes of the silicon controlled rectifiers.

References Cited by the Examiner

UNITED STATES PATENTS

| | | |
|---|---|---|
| 3,070,739 | 12/1962 | Hansen et al. |
| 3,155,847 | 11/1964 | Kirchmier _____ 307—93 |
| 3,158,799 | 11/1964 | Kelly et al. |
| 3,177,418 | 4/1965 | Meng. |
| 3,195,029 | 7/1965 | Gilbreath. |
| 3,204,113 | 8/1965 | Snygg _____ 307—88.5 X |
| 3,211,929 | 10/1965 | Prines et al. _____ 307—93 |
| 3,214,677 | 10/1965 | Baude. |
| 3,218,542 | 11/1965 | Taylor. |

OTHER REFERENCES

"Applications and Circuit Design Notes," Solid State Products, Inc., pp. 17–19, Bulletin D420–02, August 1959.

ORIS L. RADER, *Primary Examiner.*

W. M. SHOOP, T. B. JOIKE, *Assistant Examiners.*